July 22, 1969 C. C. RECTOR 3,456,960
TWO-WHEEL HAND CART WITH FOLDING LOAD SUPPORTING MEMBERS
Filed Dec. 18, 1967
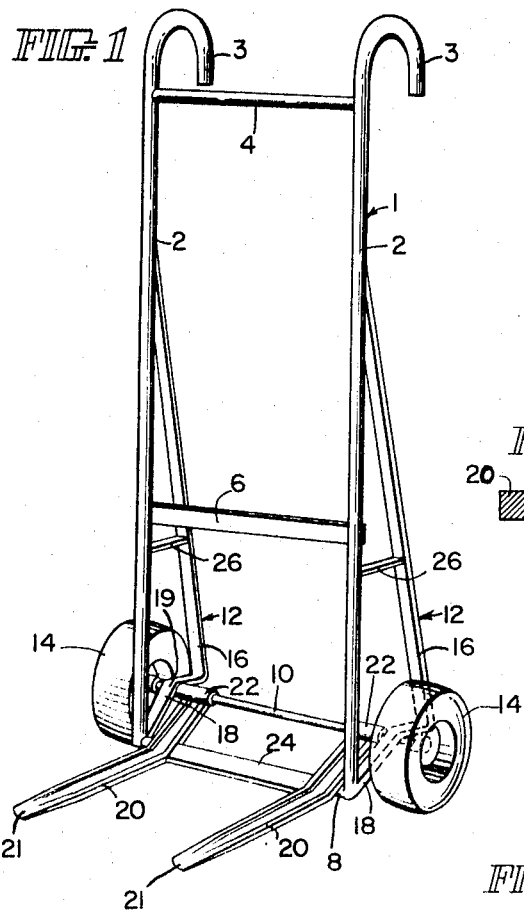
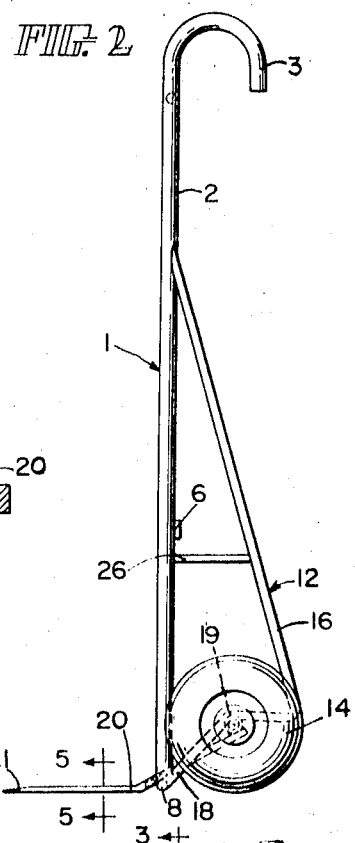
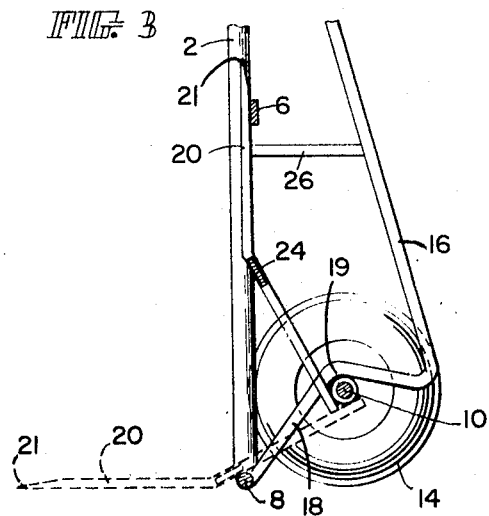
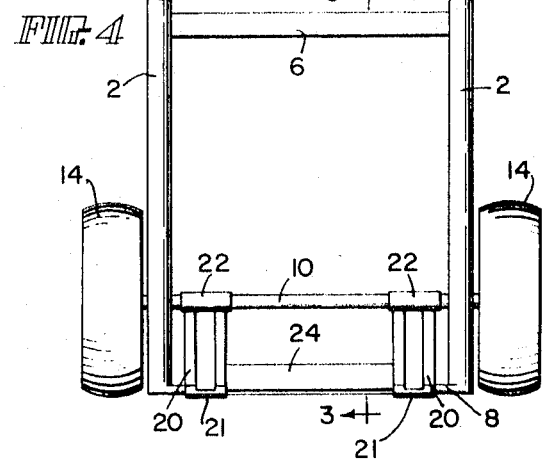
CLIFFORD C. RECTOR
INVENTOR.
BY
*Wayland D. Keith*
HIS AGENT

United States Patent Office 3,456,960
Patented July 22, 1969

---

3,456,960
TWO-WHEEL HAND CART WITH FOLDING
LOAD SUPPORTING MEMBERS
Clifford C. Rector, 3413 Garfield,
Wichita Falls, Tex. 76308
Filed Dec. 18, 1967, Ser. No. 691,368
Int. Cl. B62b 1/00, 7/02
U.S. Cl. 280—47.29           2 Claims

ABSTRACT OF THE DISCLOSURE

A portable, folding, two-wheel hand cart, that is sufficiently light to be easily lifted onto and from a truck, which cart has a braced frame of tubular members. A bill or load supporting member may be slipped under cartons or boxes to be handled, but when not in use, may be pivoted about the wheel axle to lie within the confines of the frame. The cart may be loaded while in a substantially upright position.

---

This invention relates to portable, two-wheel, folding hand carts and more particularly to hand carts which are light in weight and which may be easily transported from place to place, and which require a minimum of space.

Various hand carts have been proposed heretofore, but these for the most part, were for heavy duty work and were not readily transportable. Such carts as were light enough to be transported were, for the most part, bulky to handle and the construction of which did not readily lend to the use on transport trucks, such as trucks that handle cartons, crates, cases of bottles and the like.

The present truck is primarily made of lightweight material which may be readily and easily lifted onto and from a truck or the like, and unfolded for use for transporting cartons, cases of bottles and the like, from a truck to the warehouse or other place of disposition or vice versa.

An object of the invention is to provide a portable, two-wheel hand truck, a portion of which folds to enable the hand truck to be readily handled on a truck or the like and to be readily unloaded therefrom or loaded thereonto.

Another object of the invention is to provide a portable, two-wheel, folding hand truck that may be readily moved up stair steps or down steps, without the usual bump which accompanies the moving of two-wheel hand trucks up and down steps.

Another object of the invention is to provide a folding carton or package engaging bill or load supporting members that will permit the truck to be loaded in a substantially vertical position and after the load is in place to be transported to the place of disposition of the merchandise, the bill or load supporting members, may be pivoted about the axis of the axle and folded within the confines of the frame of the portable, two-wheel, hand truck for transportation.

Another object of the invention is to provide a bill or load support members which have a minimum of contact surface which will enable cartons or boxes to be moved thereonto and therefrom with ease.

Another object of the invention is to provide a portable, two-wheel, hand truck which is light in weight, simple in construction and low in the cost of manufacture and which is sturdy in construction.

With these objects in view and others which will become manifest as description proceeds reference is to be had to the accompanying drawings in which like reference characters designate like parts in the several views thereof, in which:

FIG. 1 is a perspective view of the portable, two-wheel, folding hand truck, taken from a side and the front thereof;

FIG. 2 is a side elevational view of the portable, two-wheel, hand truck;

FIG. 3 is an enlarged fragmentary sectional view taken on line 3—3 of FIG. 4, looking in the direction indicated by arrows, showing the bill or load supporting member in folded position in full outline, the extended position thereof being shown in dashed outline;

FIG. 4 is a fragmentary, front elevational view, on an enlarged scale, showing the bill or load supporting members folded down with the hand truck being in vertical position; and FIG. 5 is an enlarged sectional view taken on line 5—5 of FIG. 2, looking in the direction indicated by the arrows.

With more detailed reference to the drawing the numeral 1 designates generally a structural frame comprising first upright tubular members 2 and second upright members 16, with transverse brace members 4, 6 and 8 which extend between tubular members 2.

Inverted, V-shaped, transverse axle supporting members 18 extend between the lower ends of the respective first and second upright members 2 and 16. An axle 10 is secured to the inverted V-shaped transverse axle supporting members 18 on the lower side of the apex thereof. Wheels 14 are journaled on axle 10 and are of such diameter that the rear peripheral faces of the wheels lie in a plane common with the rear faces of the frames. An upright second member 16 is positioned on each side of the frame 12 and connects with tubular members 2 at the upper end. Each of the axle support members 18, which extend between the upright first members and the second upright members, has an upwardly extending apex 19 intermediate the length thereof to form saddles, in which apex the axle 10 is secured as by welding or the like, thereby to lower the center of gravity of the frames 2 and 12 with respect to the axle 10. The wheels 14, which are journaled on axle 10, enable the frame 1 to stand in an upright position, so the forward face of the frame 1 will be almost perpendicular to the floor or the like which will enable the bill or load support members 20 to be pivoted around axle 10, from a position as shown in FIG. 3 in full outline, to that shown in dashed outline therein, and in full outline in FIGS. 1, 2 and 4.

The bill or load supporting members 20 each has a tubular sleeve 22 secured to the inner ends thereof, as by welding, and which sleeves are journaled on shaft 10 to enable the bill or load support members 20 to be moved about the axis of shaft 10 from position as indicated in FIG. 3 in full outline to that indicated in dashed outline, the same figure. The bill or load support members 20 have a transverse brace 24 therebetween to hold the bars or load support members 20 in spaced apart relation. The brace 24 is substantially flush with the lower side of the load support members 20 and is adapted to seat on a transverse brace member 8 extending between the lower ends of tubular member 2. In this manner the load on the bill or load support members 20 is transferred to transverse brace 8, which brace 8 is secured to tubular members 2 as by welding, the load is then transmitted to the tubular members 2 and to the support members 18, which extend between tubular member 8 and angulated brace or frame member 12.

A further brace member 26 is positioned between second upright frame members 12 and the respective first, upright tubular members 2, which bracing enables the second upright members 16 and upright tubular members 2 to be made of relatively lightweight material so that the hand cart may be made to give a maximum of strength with a minimum of weight.

The wheels 14 are journaled near the outer ends of the axle 10 so that the axles preferably will not be on the outer lateral confines of the wheels 14. Each of the load support members 20 is ribbed, as will best be seen in FIG. 5, which ribs extend upward to present a relatively narrow face to permit boxes, cartons or the like to be easily slipped onto and off of load support members 20. The outer end of each load support members 20 has a wedge or tapered edge 21 to enable the bill, or load support members 20 to be moved under a carton, crate or the like with ease.

The upper end of tubular members 2 have the ends 3 thereof curved to form hooks by which the cart is secured to a truck frame, when not in use, which hooks serve as handles for the operator of the two-wheel cart. The hooks 3 enable the cart to be readily supported on a side of a vehicle or the like and with the load supporting members 20 in a position as indicated in FIG. 3, the cart may be readily moved from place to place with the vehicle with a minimum of inconvenience.

Having thus clearly shown and described the invention, what is claimed as new and desired to be secured by Letters Patent is:

1. A portable, two-wheel hand cart, which cart comprises:
   (a) a first pair of upright members forming a portion of a frame,
   (b) a second pair of upright members, one member of each said second pair being secured to the rear of the respective members of said first pair of upright members, intermediate the length thereof,
      (1) said second pair of upright members being angulated and diverging downwardly and rearwardly with respect to said first pair of upright members,
   (c) a pair of transverse members, one extending between the lower ends of the respective first and second upright members, to become a portion of the frame and to form axle support members,
   (d) transverse braces extending between said first pair of upright members to complete a substantially rectangular frame,
   (e) an axle mounted on said axle support members,
   (f) wheels mounted on said axle, one near each end thereof,
      (1) said second pair of angulated, upright members has the outer face thereof lying in a plane substantially tangent to the circumference of said wheels,
      (2) the lower end of said second pair of angulated, upright members terminating in a plane substantially at the point of tangency with said wheels,
   (g) a load supporting member pivotally mounted on said axle and extending outwardly and being supported on one of said transverse brace members, when said load supporting member is in one position, and
      (1) said load supporting member, which is pivotally mounted on said axle, being adapted to hinge to a position within the confines of said frame members, when in another position.

2. A portable, two-wheel hand cart, as defined in claim 1, wherein
   (a) said load support member comprises a pair of members which are spaced apart substantially the width of the inside dimension of said rectangular frame,
   (b) each member of said pair of load support members being angulated intermediate the length thereof so said support members will lie substantially flat on the floor, when said first pair of upright members of the hand cart is in a substantially vertical position and with the wheels being in contact relation with the loading surface,
   (c) each said load support member extends outwardly and each is grooved intermediate the width thereof, to form skids of reduced frictional area, and
   (d) said first pair of upright frame members having re-entrant portions of the upper ends thereof, which re-entrant portions form support hooks.

References Cited
UNITED STATES PATENTS

| | | | |
|---|---|---|---|
| 2,198,918 | 4/1940 | Mercil | 280—47.27 |
| 2,329,439 | 9/1943 | Hanssen | 280—47.29 |
| 2,554,091 | 5/1951 | Davis | 280—47.29 |
| 3,046,035 | 7/1962 | Nichols | 280—47.27 |

FOREIGN PATENTS

| | | |
|---|---|---|
| 1,208,219 | 2/1960 | France. |

BENJAMIN HERSH, Primary Examiner

JOHN A. PEKAR, Assistant Examiner